United States Patent
Zhou

(10) Patent No.: US 9,270,161 B2
(45) Date of Patent: Feb. 23, 2016

(54) POWER SUPPLY CIRCUIT FOR PREVENTING OVERVOLTAGE

(71) Applicant: ScienBiziP Consulting (Shen Zhen) Co., Ltd., Shenzhen (CN)

(72) Inventor: Hai-Qing Zhou, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 181 days.

(21) Appl. No.: 14/141,382

(22) Filed: Dec. 26, 2013

(65) Prior Publication Data

US 2014/0177297 A1    Jun. 26, 2014

(30) Foreign Application Priority Data

Dec. 26, 2012    (CN) .......................... 2012 1 05732793

(51) Int. Cl.
*H02M 1/32* (2007.01)
*H02M 3/158* (2006.01)
*H02M 1/15* (2006.01)

(52) U.S. Cl.
CPC .............. *H02M 1/32* (2013.01); *H02M 3/1588* (2013.01); *H02M 1/15* (2013.01); *Y02B 70/1466* (2013.01)

(58) Field of Classification Search
CPC ........... H02M 1/36; H02M 1/32; H02M 3/20; H02M 2001/0032; G06F 1/26
See application file for complete search history.

(56) References Cited

U.S. PATENT DOCUMENTS

| | | | | |
|---|---|---|---|---|
| 3,378,758 | A * | 4/1968 | Goodenow | H02M 3/1563 323/289 |
| 4,278,930 | A * | 7/1981 | Rogers | G01R 1/28 323/277 |
| 4,584,517 | A * | 4/1986 | Schwob | H02M 3/1563 323/222 |
| 4,819,117 | A * | 4/1989 | Brennan | H02H 1/043 323/901 |
| 5,939,870 | A * | 8/1999 | Nguyen | G05F 1/575 323/282 |
| 7,420,355 | B2 * | 9/2008 | Liu | H02M 3/158 323/271 |
| 2005/0212501 | A1 * | 9/2005 | Acatrinei | G05F 1/575 323/282 |
| 2007/0024223 | A1 * | 2/2007 | You | H02P 1/18 318/272 |
| 2009/0040794 | A1 * | 2/2009 | Williams | H02M 3/1588 363/21.14 |
| 2009/0180303 | A1 * | 7/2009 | Liu | H02M 1/08 363/21.14 |
| 2010/0097046 | A1 * | 4/2010 | Hu | H02M 3/158 323/311 |

(Continued)

*Primary Examiner* — Timothy J Dole
*Assistant Examiner* — Yusef Ahmed
(74) *Attorney, Agent, or Firm* — Novak Druce Connolly Bove + Quigg LLP

(57) ABSTRACT

A power supply circuit preventing any overvoltage to an electronic element includes a voltage conversion unit and a voltage clamping unit. The voltage conversion unit converts voltage of a power supply into an operation voltage of the electronic element, and outputs the converted voltage through an output terminal of the voltage conversion unit. When the voltage output from the output terminal of the voltage conversion unit is more than the operation voltage of the electronic element, the voltage clamping unit effectively clamps the voltage output from the output terminal of the voltage conversion unit down to the operation voltage of the electronic element.

7 Claims, 2 Drawing Sheets

(56) References Cited

U.S. PATENT DOCUMENTS

| | | | | |
|---|---|---|---|---|
| 2010/0244796 | A1* | 9/2010 | Chen | H02M 3/156 323/282 |
| 2011/0068760 | A1* | 3/2011 | Zhou | G06F 1/26 323/282 |
| 2011/0235225 | A1* | 9/2011 | Zhou | H02M 1/32 361/93.7 |
| 2011/0310522 | A1* | 12/2011 | Zhou | G06F 1/206 361/103 |
| 2012/0262148 | A1* | 10/2012 | Tu | G01R 19/16552 324/76.11 |
| 2012/0293901 | A1* | 11/2012 | Song | G06F 1/28 361/91.1 |
| 2013/0069633 | A1* | 3/2013 | Tu | G01P 3/4805 324/163 |
| 2013/0088832 | A1* | 4/2013 | Li | H02H 5/042 361/679.48 |
| 2013/0128404 | A1* | 5/2013 | Tu | H02H 3/202 361/86 |
| 2013/0154722 | A1* | 6/2013 | Zhou | H03K 5/2481 327/540 |
| 2013/0300212 | A1* | 11/2013 | Chen | H03K 17/00 307/113 |
| 2014/0184181 | A1* | 7/2014 | Zhou | H02M 1/32 323/271 |
| 2014/0253022 | A1* | 9/2014 | Zhou | H02J 7/022 320/107 |
| 2015/0077082 | A1* | 3/2015 | Kilic | H02M 1/32 323/284 |
| 2015/0229210 | A1* | 8/2015 | Takada | H02M 3/156 323/284 |

\* cited by examiner

POWER SUPPLY CIRCUIT FOR PREVENTING OVERVOLTAGE

BACKGROUND

1. Technical Field

The present disclosure relates to a power supply circuit.

2. Description of Related Art

A central processing unit (CPU) is an expensive and important part of an electronic device, such as a computer. When the CPU is damaged, the electronic device will no longer operate. A high input voltage can damage the CPU.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present embodiments.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references can mean "at least one".

Figure 1:
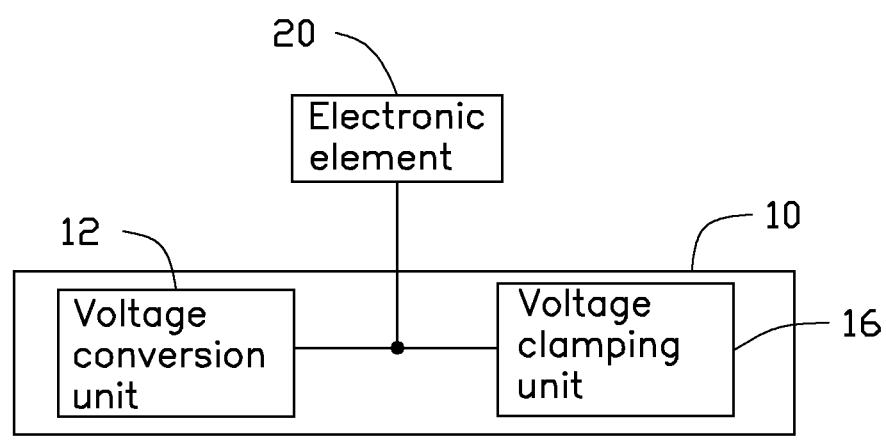
FIG. 1 is a block diagram of an embodiment of a power supply circuit.
Figure 2:
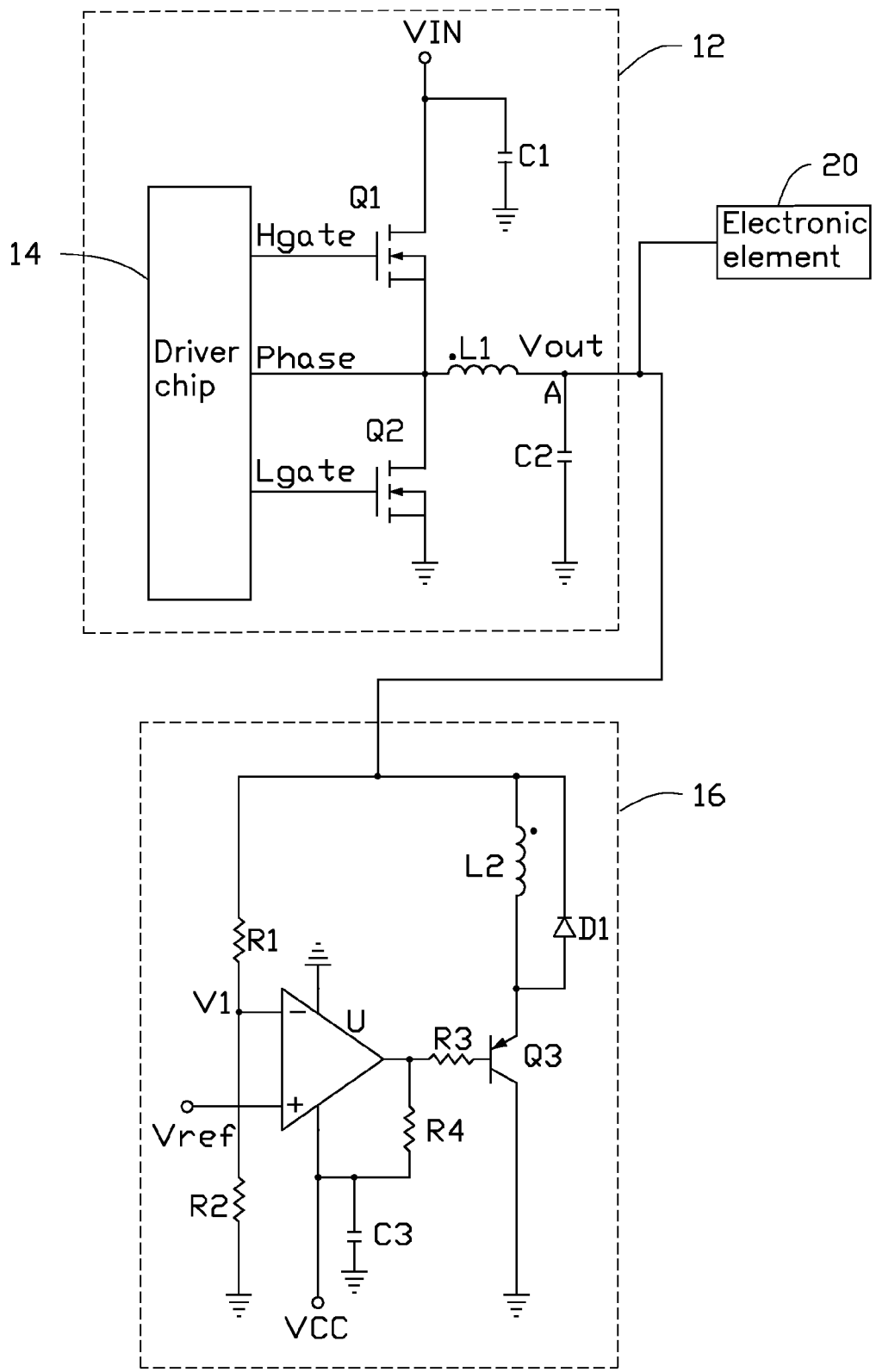
FIG. 2 is a circuit diagram of the power supply circuit of FIG. 1.

FIGS. 1 and 2 show an embodiment of a power supply circuit 10 to supply power to an electronic element 20. The power supply circuit 10 includes a voltage conversion unit 12 and a voltage clamping unit 16. The voltage conversion unit 12 is connected to the voltage clamping unit 16 and the electronic element 20. The voltage conversion unit 12 is used to convert a voltage of a power supply into an operation voltage of the electronic element 20, and output the converted voltage through an output terminal of the voltage conversion unit 12. The voltage clamping unit 16 is used to clamp a voltage output from the output terminal of the voltage conversion unit 12 to the operation voltage of the electronic element 20, when the voltage output from the output terminal of the voltage conversion unit 12 is more than the operation voltage of the electronic element 20. In one embodiment, the power supply circuit 10 is assembled on a motherboard of a computer, and the electronic element 20 is a central processing unit.

The voltage conversion unit 12 includes a driver chip 14, two electronic switches Q1 and Q2, two capacitors C1 and C2, and an inductor L1. The driver chip 14 includes a first pin Hgate, a second pin Lgate, and a third pin Phase. Each of the electronic switches Q1 and Q2 includes a first terminal, a second terminal, and a third terminal. The first terminal of the electronic switch Q1 is connected to the first pin Hgate of the driver chip 14. The second terminal of the electronic switch Q1 is connected to a power supply VIN, and grounded through the capacitor C1. The third terminal of the electronic switch Q1 is grounded through the inductor L1 and the capacitor C2 in that order. The first terminal of the electronic switch Q2 is connected to the second pin Lgate of the driver chip 14. The second terminal of the electronic switch Q2 is connected to the third terminal of the electronic switch Q1, and connected to the third pin Phase of the driver chip 14. The third terminal of the electronic switch Q2 is grounded. A node A between the inductor L1 and the capacitor C2 functions as an output terminal of the voltage conversion unit 12, and is connected to the voltage clamping unit 16 and the electronic element 20.

The voltage clamping unit 16 includes a comparator U, an electronic switch Q3, an inductor L2, a diode D1, a capacitor C3, and four resistors R1-R4. The comparator U includes a non-inverting terminal, an inverting terminal, a power terminal, a ground terminal, and an output terminal. The non-inverting terminal of the comparator U is connected to a reference voltage Vref. The inverting terminal of the comparator U is connected to the output terminal of the voltage conversion unit 12 through the resistor R1, and grounded through the resistor R2. The power terminal of the comparator U is connected to a power supply VCC, and grounded through the capacitor C3. The ground terminal of the comparator U is grounded. The output terminal of the comparator U is connected to the power terminal of the comparator U through the resistor R4. The first terminal of the electronic switch Q3 is connected to the output terminal of the comparator U through the resistor R3. The second terminal of the electronic switch Q3 is grounded. The third terminal of the electronic switch Q3 is connected to the output terminal of the voltage conversion unit 12 through the inductor L2. An anode of the diode D1 is connected to the third terminal of the electronic switch Q3. A cathode of the diode D1 is connected to the output terminal of the voltage conversion unit 12.

In one embodiment, each of the electronic switches Q1 and Q2 is an n-channel metal-oxide semiconductor field-effect transistor (NMOSFET), and the first terminal, the second terminal, and the third terminal of each of the electronic switches Q1 and Q2 respectively correspond to a gate, a drain, and a source of the NMOSFET. The electronic switch Q3 is a pnp bipolar junction transistor (BJT), and the first terminal, the second terminal, and the third terminal of each of the electronic switches Q3 respectively correspond to a base, a collector, and an emitter of the pnp BJT. A voltage of the inverting terminal of the comparator U complies with the following formula: $V1=Vout \times r2/(r1+r2)$, where V1 stands for the voltage of the inverting terminal of the comparator U, Vout stands for a voltage of the output terminal of the voltage conversion unit 12, r1 stands for a resistance of the resistor R1, and r2 stands for a resistance of the resistor R2. The reference voltage Vref is a double data rate voltage termination (DDR_VTT) mode of operation supplied by the motherboard of the computer. The DDR_VTT is a half-operating voltage of the double data rate memory. In other embodiments, each of the electronic switches Q1 and Q2 may be an npn BJT, or another electronic switch having similar functions. The electronic switch Q3 may be a p-channel metal-oxide semiconductor field-effect transistor, or another electronic switch having similar functions.

In use, the first pin Hgate and the second pin Lgate of the driver chip 14 alternately output high level signals to turn on the electronic switches Q1 and Q2. When the first pin Hgate outputs a high level signal, such as logic 1, and the second pin Lgate outputs a low level signal, such as logic 0, the electronic switch Q1 is turned on, and the electronic switch Q2 is turned off. The power supply VIN is filtered by the capacitor C1, then supplies power to charge the inductor L1 and the capacitor C2 through the electronic switch Q1. When the first pin Hgate outputs a low level signal, and the second pin Lgate outputs a high level signal, the electronic switch Q1 is turned off, and the electronic switch Q2 is turned on. The inductor L1 and the capacitor C2 are discharged through the electronic switch Q2. The output terminal of the voltage conversion unit 12 can then output the voltage Vout.

When the voltage Vout of the output terminal of the voltage conversion unit 12 is equal to the operation voltage of the electronic element 20, the voltage V1 of the inverting terminal of the comparator U is less than the reference voltage Vref. The output terminal of the comparator U outputs a high level signal, and the electronic switch Q3 is turned off.

When the voltage Vout of the output terminal of the voltage conversion unit 12 is too high, because some elements of the motherboard are in abnormal conditions, such as a short circuit, the voltage V1 of the inverting terminal of the comparator U is more than the reference voltage Vref. The output terminal of the comparator U outputs a low level signal, and thus the electronic switch Q3 is turned on. The inductor L2 is grounded through the electronic switch Q3 to pull down the voltage Vout of the output terminal of the voltage conversion unit 12, and the inductor L2 is charged by the voltage Vout of the output terminal of the voltage conversion unit 12 at the same time. When the voltage Vout of the output terminal of the voltage conversion unit 12 is pulled down to the operation voltage of the electronic element 20, the voltage V1 of the inverting terminal of the comparator U is less than the reference voltage Vref. The output terminal of the comparator U outputs a high level signal, and the electronic switch Q3 is turned off. The inductor L2 is discharged through the diode D1. Therefore, the voltage Vout of the output terminal of the voltage conversion unit 12 is clamped and held to the operation voltage of the electronic element 20 by the voltage clamping unit 16, to prevent damage to the electronic element 20 from a high input voltage.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power supply circuit to supply power to an electronic element, the power supply circuit comprising a voltage conversion unit comprising an output terminal connected to the electronic element, and a voltage clamping unit comprising:
    a first resistor;
    a second resistor;
    a third resistor;
    a fourth resistor;
    a first capacitor;
    a first inductor;
    a comparator comprising a non-inverting terminal connected to a reference voltage, an inverting terminal connected to the output terminal of the voltage conversion unit through the first resistor and grounded through the second resistor, and an output terminal;
    a first electronic switch comprising a first terminal connected to the output terminal of the comparator, a second terminal grounded, and a third terminal connected to the output terminal of the voltage conversion unit through the first inductor; and
    a diode comprising an anode connected to the third terminal of the first electronic switch, and a cathode connected to the output terminal of the voltage conversion unit;
    wherein in response to a voltage of the output terminal of the voltage conversion unit being more than an operation voltage of the electronic element, a voltage of the inverting terminal of the comparator is more than the reference voltage, the output terminal of the comparator outputs a low level signal, the first electronic switch is turned on, the first inductor is grounded through the first electronic switch to pull down the voltage of the output terminal of the voltage conversion unit, and the first inductor is charged by the voltage of the output terminal of the voltage conversion unit; in response to the voltage of the output terminal of the voltage conversion unit being pulled down to the operation voltage of the electronic element, the voltage of the inverting terminal of the comparator is less than the reference voltage, the output terminal of the comparator outputs a high level signal, the first electronic switch is turned off, and the first inductor is discharged through the diode;
    wherein the comparator further comprises a power terminal connected to a first power supply and grounded through the first capacitor, and a ground terminal grounded; the output terminal of the comparator is grounded through the third resistor, and connected to the power terminal of the comparator through the fourth resistor.

2. The power supply circuit of claim 1, wherein the voltage conversion unit further comprises:
    a first second capacitor;
    a second inductor;
    a driver chip comprising a first pin, a second pin, and a third pin;
    a second electronic switch comprising a first terminal connected to the first pin of the driver chip, a second terminal connected to a first second power supply, and a third terminal grounded through the second inductor and the first second capacitor in that order; and
    a third electronic switch comprising a first terminal connected to the second pin of the driver chip, a second terminal connected to the third terminal of the second electronic switch and the third pin of the driver chip, and a third terminal grounded;
    wherein a node between the second inductor and the first second capacitor functions as the output terminal of the voltage conversion unit, and is connected to the electronic element.

3. The power supply circuit of claim 2, wherein the first pin and the second pin of the driver chip alternately output high level signals to turn on the second or third electronic switch; when the first pin of the driver chip outputs a high level signal, and the second pin of the driver chip outputs a low level signal, the second electronic switch is turned on, the third electronic switch is turned off, and the second inductor and the first second capacitor is charged by the first second power supply; when the first pin of the driver chip outputs a low level signal, and the second pin of the driver chip outputs a high level signal, the second electronic switch is turned off, the third electronic switch is turned on, and the first second capacitor and the second inductor are discharged through the third electronic switch.

4. The power supply circuit of claim 3, wherein each of the second electronic switch and the third electronic switch is an n-channel metal-oxide semiconductor field-effect transistor (NMOSFET), and the first terminal, the second terminal, and the third terminal of each of the second electronic switch and the third electronic switch are respectively a gate, a drain, and a source of the NMOSFET.

5. The power supply circuit of claim 2, wherein the voltage conversion unit further comprises a second third capacitor, and the first second power supply is grounded through the second third capacitor.

6. The power supply circuit of claim 1, wherein the first electronic switch is a pnp bipolar junction transistor (BJT), and the first terminal, the second terminal, and the third terminal of the first electronic switch are respectively a base, a collector, and an emitter of the pnp BJT.

7. The power supply circuit of claim 1, wherein the reference voltage is a double data rate voltage termination (DDR_VTT), and the DDR_VTT is a half operation voltage of a double data rate memory.

* * * * *